US008629676B2

(12) United States Patent
Kronawitter et al.

(10) Patent No.: US 8,629,676 B2
(45) Date of Patent: Jan. 14, 2014

(54) POSITION ENCODER COMPRISING A PLASTIC ELEMENT

(75) Inventors: Rudolf Kronawitter, Hauzenberg (DE); Willi Wimmer, Hauzenburg (DE)

(73) Assignee: Sumida Components & Modules GmbH, Obernzell (DE)

( * ) Notice: Subject to any disclaimer, the term of this patent is extended or adjusted under 35 U.S.C. 154(b) by 686 days.

(21) Appl. No.: 12/681,525

(22) PCT Filed: Sep. 10, 2008

(86) PCT No.: PCT/EP2008/007425
§ 371 (c)(1),
(2), (4) Date: Aug. 13, 2010

(87) PCT Pub. No.: WO2009/059656
PCT Pub. Date: May 14, 2009

(65) Prior Publication Data
US 2010/0301843 A1    Dec. 2, 2010

(30) Foreign Application Priority Data

Nov. 9, 2007  (DE) .................. 10 2007 053 601

(51) Int. Cl.
*G01B 7/30*    (2006.01)
(52) U.S. Cl.
USPC ............................. 324/207.25; 324/207.24
(58) Field of Classification Search
None
See application file for complete search history.

(56) References Cited

U.S. PATENT DOCUMENTS

| 4,743,786 | A   | 5/1988 | Ichikawa et al. |
| 4,764,767 | A   | 8/1988 | Ichikawa et al. |
| 5,083,084 | A   | 1/1992 | Bauer et al. |
| 2008/0136861 | A1* | 6/2008 | Free et al. ..................... 347/21 |
| 2010/0156402 | A1* | 6/2010 | Straubinger et al. ...... 324/207.25 |

FOREIGN PATENT DOCUMENTS

| DE | 3642678 A1 | 6/1988 |
| DE | 102 31 980 A1 | 2/2004 |
| DE | 103 20 941 A1 | 12/2004 |
| DE | 102006026543 A1 * | 12/2007 |
| EP | 1 801 545 A1 | 6/2007 |
| JP | 62-47501 A | 3/1987 |
| JP | 7-49353 A | 2/1995 |
| JP | 2003-75106 A | 3/2003 |
| JP | 2003-302251 A | 10/2003 |
| WO | WO 2007002995 A1 * | 1/2007 |

OTHER PUBLICATIONS

Machine English translation of German Patent Application Publication to Applicants Bartl J et al. DE 102006026543 A1, Dec. 13, 2007. Translation of Description, pp. 2-8 created on Feb. 16, 2013.*
Machine English translation of German Patent Application Publication to Applicant Schubach, Rudolf. DE 10231980 A1, Feb. 19, 2004. Translation of Description, pp. 2-4 created on Feb. 12, 2013.*

(Continued)

*Primary Examiner* — Melissa Koval
*Assistant Examiner* — Stephen G Armstrong
(74) *Attorney, Agent, or Firm* — Birch, Stewart, Kolasch & Birch, LLP (57) ABSTRACT

Disclosed is a position sensor, in particular a rotor position sensor, comprising a base. A track that is provided with a conducting coating is formed within the surface of the base relevant for evaluating signals. Since the track is formed within the base, the desired position-dependent modulation of the eddy current behavior is obtained by design measures, resulting in low manufacturing tolerance and reduced production costs.

7 Claims, 8 Drawing Sheets

(56) References Cited

OTHER PUBLICATIONS

Machine English translation of German Patent Application Publication to Applicants Niehaus U et al. DE 10320941 A1, Dec. 2, 2004. Translation of Description, pp. 2-4 created on Feb. 9, 2013.*

Machine English translation of European Patent Application Publication to Applicants Fischer et al. EP 1801545 A1, Jun. 27, 2006. Translation of Description, pp. 2-4 created on Mar. 20, 2013.*
Notice of Grounds of Rejection for corresponding Japanese Patent Application No. 2010-532450, dated Jan. 29, 2013.

* cited by examiner

POSITION ENCODER COMPRISING A PLASTIC ELEMENT

This application is a national stage application of a PCT application No. PCT/EP2008/007425, filed on Sep. 10, 2008, the entire contents of which are hereby incorporated by reference; and this application claims priority to Application No. 10 2007 053601.3 filed in Germany on Nov. 9, 2007 under 35 U.S.C. §119.

BACKGROUND

The present invention refers in general to eddy current sensor assemblies in which a position of an encoder element is determined relative to a coil assembly on the basis of position-dependent eddy-current losses, and the present invention refers particularly to an encoder element for such a sensor assembly.

In many technical fields the position of a moving object must be determined with an accuracy dictated by the respective purposes of use. To this end many sensor systems have been developed in which at least the relative position between two elements can be measured with a sufficiently high precision by e.g. optical, electrical, magnetic and other interactions. Particularly in technical sectors in which very exacting ambient conditions prevail, e.g. high operating temperatures in combination with high magnetic fields, which may e.g. be caused by high operating currents, sensor assemblies are often used in which the position-dependent generation of eddy currents is used for determining the position of a component. To this end in some examples of such an eddy-current sensor assembly, the attenuation of one or a plurality of coils, which is caused by eddy currents, is sensed, wherein the one or a plurality of coils is provided as stationary components, and a moved component comprises a track of a suitable material, resulting in a position-dependent eddy-current generation and thus attenuation. On the basis of said position-dependent eddy current generation, through correlation of the generated attenuation, which can e.g. be determined on the basis of a frequency change, phase change, amplitude change or a combination of said parameters, and the particular design of the track, it is possible to determine the position of the moving track in relation to the one or more stationary coils.

An important application in this respect is the determination of the position of a rotor of an electric machine to determine suitable control signals for the supply of suitable current and voltage values. For instance, it is important for many application purposes where very variable rotational speeds and a moderately large control bandwidth are needed for the electric machine that the voltage or current values are injected with a high resolution in time, which requires a relatively precise determination of the position of the rotor in many cases. For instance, it is important for an efficient operation of approximately permanently excited synchronous machines or also brushless DC machines that the position of the rotor is quite precisely known in conformity with the used pole number of the magnets inside an angular segment to as to energize the stator windings with a suitable pattern, whereby the desired mode of operation is obtained. Contactless sensor mechanisms are often used for this purpose, wherein sensor assemblies based e.g. on magnetic switches or Hall sensors are used, which are, however, relatively complicated and also susceptible to noise, wherein the necessary spatial resolution is often not reached for many applications as a rule. Since particularly with applications for detecting the angular position a spatially narrow coupling of the encoder element with the rotor of the electric machine is often required, high currents or magnetic fields and also relatively high temperatures may occur near the encoder element, so that sensors according to the eddy current principles have here turned out to be particularly useful as they can be designed on the one hand such that they are not significantly interfered with by high external magnetic fields and permit, on the other hand, a high spatial resolution of the rotor position also at the time when the sensor assembly is activated.

In such conventional sensor assemblies an encoder wheel is typically used that is e.g. coupled with the rotor of the electric machine and the periphery of which comprises an appropriately formed track, e.g. in the form of a sinusoidally changing metal conductor, e.g. of copper or aluminum, which is read out by a coil assembly. This encoder wheel is thus in mechanical contact with the rotor of the electric machine and, apart from the desired noise immunity with respect to high magnetic fields, it must also be adapted to the other operating conditions of the electric machine, e.g. with respect to the prevailing temperatures, the necessary speed range, or the like. On the other hand, with respect to the integration of the eddy-current sensor system a high constant precision is also needed in mass manufacture for permitting a uniform function of the sensors without any complicated adjusting work during installation for end use. As a rule, in conventional encoder wheels, the exacting mechanical properties with respect to strength, quiet running, and the necessary electrical properties, i.e. the position dependent adjustment of conductivity by means of an approximately sinusoidally changing coil, therefore require corresponding efforts in the manufacture of the encoder wheels, their final assembly and adjustment.

BRIEF SUMMARY OF THE INVENTION

In view of the above-described situation it is therefore an object of the present invention to provide an encoder element for a sensor assembly based on eddy current, in which the properties for mechanical stability and precision in combination with the necessary electrical behavior can be improved and/or said properties can be achieved under less efforts.

According to one aspect of the present invention this object is achieved by a position encoder for generating position-dependent eddy-current losses in a sensor coil assembly. The position encoder comprises a base made of plastics with a surface to be oriented during operation in the direction of the sensor coil assembly. Furthermore, the position encoder comprises a track formed in the base by recesses and/or elevations in the surface of plastics, which track extends along a predetermined direction of movement and varies at least in a direction perpendicular to the predetermined direction of movement. Furthermore, there is a coating which is provided at least on the track and comprises a conductive material.

Hence, the position encoder according to the invention comprises a base made of plastics which can thus be produced with respect to the material composition and also with respect to shape and size in a very flexible and efficient way with high accuracy at low manufacturing costs. Here, one surface of the position encoder, i.e. a surface which carries the track formed with respect to the position-dependent eddy current generation, is first predetermined by a profiling of the plastic material in its shape, so that the track can also be produced with high precision and little efforts, e.g. in the same operation as the base. Thus, e.g. the spatial structure of the track which is configured along the direction of movement, i.e., a direction along which during operation of the position encoder a detection of the location of the position encoder is to take place in relation to the sensor coil assembly, can be defined with high precision by constructional measures, e.g. by way of an injection mold while the electrical properties of the track are adjusted by the coating. In this way a desired mechanical stability adapted to the respective object is achievable on the one hand by way of the plastic material of the base, wherein on the other hand under little manufacturing efforts a very precise configuration of the track route, which in the final analysis also provides for the desired spatial resolution, is guaranteed. The electrical properties, i.e. the conductivity of the track, is guaranteed by the coating which thus offers a high degree of flexibility with respect to the selection of suitable materials, e.g. suitable metals, alloys, semiconductor materials, conductive plastics, or the like, where the application of the coating is less critical with respect to the achieved overall accuracy of the conductive track created thereby because the position-dependent conductivity of the track is substantially given by the geometry of the profile formed in the plastic material.

In an advantageous embodiment the track is configured as an elevation in the surface. This means that in this embodiment the surface facing the sensor coil assembly during operation shows a suitably designed elevation along the direction of movement that shows the desired spatial variation. Due to the elevated configuration of the track formed in the surface, one automatically obtains a different distance of elevated portions from non-elevated portions in relation to the sensor coil assembly during operation, so that due to the construction a distinct difference is achieved in the eddy current behavior between the surface of the base that is lowered in comparison with the surface of the track, which surface thereby exerts much less influence on eddy current generation even if the surface is coated in part or fully with a conducting material to simplify the coating process.

In a further advantageous embodiment, a height of the track along the predetermined direction of movement is constant and a width of the track is variable along the predefined direction of movement. This means that the position-dependent eddy-current generating capacity is created by a lateral variation, i.e. by a change in the width of the track, while the track is lifted from the surface according to a substantially constant value.

In a further advantageous configuration the height of the track varies along the predetermined direction of movement. Hence, in this embodiment a position-dependent eddy-current generation can be achieved through a varying height of the track and thus through a varying distance of the track surface and thus of the coating that serves as a signal area, in relation to the stationary sensor coil assembly. A corresponding design of the topography of the track can be achieved in the plastic base in an efficient way in that appropriate manufacturing methods, e.g. an injection molding method, or the like, are used. Hence, a suitable height profile can be produced in a reproducible and efficient way.

In a further advantageous design, in combination with the height of the track, the width of the track also varies along the predetermined direction of movement. The response behavior of the track to a varying magnetic field caused by the sensor coil assembly can be modulated in a very efficient way because two degrees of freedom are thereby available that together permit a strong change per unit length along the direction of movement. Furthermore, a lower fault tolerance might be achievable due to the double modulation of the eddy current behavior because corresponding manufacturing inaccuracies in one dimension might have a less pronounced effect.

In an advantageous embodiment the predetermined direction of movement is a rotational movement. This means that the position encoder is configured to detect the position along a curved path corresponding to a rotational movement, wherein in an advantageous embodiment the angular position of a rotor of a corresponding machine can be detected at least over a desired angular range. In this instance the position encoder according to the invention can be used for determining the position of the rotor at least within an angular segment of interest, as is e.g. important in permanently excited synchronous machines or in brushless DC motors, to achieve an optimum control of the stator coils.

In a further advantageous variant the base is adapted to be fastened to a rotor or an element of a rotary machine coupled therewith. The position encoder according to the invention can thereby be produced in an efficient and precise way, as has been demonstrated above, wherein the possibility of subsequently coupling said encoder in a suitable way with a rotary machine is further given. An independent and thus inexpensive and precise manufacture of the position encoder can thereby be realized, wherein a high degree of flexibility is possible in the adaptation to the corresponding rotary machine by suitable selection of e.g. injection molds, or the like. Hence, a high degree of independence is given for the manufacture of the rotary machine and the position encoder on the one hand, and the special features of the rotary machine can be taken into account in the configuration of the base on the other hand.

In an advantageous embodiment the surface is oriented in a direction perpendicular to a rotational axis of the rotor. This means that in this assembly the track incorporated into the surface and a signal area defined thereby is also oriented in a direction perpendicular to the rotational axis of the rotor, resulting in an "axial" arrangement in which the sensor coil assembly is thereby spaced apart in axial direction from the surface and thus the track. This yields a very compact structure in radial direction because the sensor coil assembly can be positioned within the diameter predetermined by the rotor if enough constructional volume is given in axial direction.

In a further advantageous design, the surface is oriented in parallel with a rotational axis of the rotor. This means that the surface and thus the track can be configured in circumferential direction of an encoder wheel and can thus be read out in radial direction by the sensor coil assembly. If necessary, this achieves a compact structure in axial direction, which can particularly be advantageous with certain applications in the car industry if the rotary machine is arranged on the drive shaft between the motor and the corresponding transmission.

In one embodiment the coating is provided at least in part on the surface. As has been mentioned above, an efficient modulation of the eddy current behavior can be accomplished on account of the topography of the track without the exact position of the coating being essential. This means that the coating, in case of need, can be applied to the track or also to the surface in part or all over, whereby, depending on the manufacturing method employed, the manufacturing process can be simplified accordingly because no selective application of the coating is needed. In other cases the material composition of the coating may be designed such that it produces, on the one hand, the desired conductivity and, on the other hand, also permits a desired protective action or passivation for the base or at least the surface, so that both the electrical behavior and the surface property can be adjusted in an efficient way.

In a further advantageous embodiment the coating is provided on at least one further surface of the base. As has been explained already above, the coating may possibly be used as a passivation material, so that advantageously other portions of the base can also be covered thereby. Furthermore, since at least one further surface of the base is provided with the coating, it is possible to select among very many different coating methods, which permit a selective deposition not at all or only under great efforts, so that a high degree of flexibility is here given with respect to the material composition of the coating and the manufacturing costs.

In a further embodiment the coating contains a metal. Conductivity can thereby be established in a very efficient way because a great number of metals or alloys are available that on the one hand show a desired high conductivity and on the other hand an appropriate behavior with respect to chemical stability, or the like. In other cases a suitable metal may be contained in the coating in any desired way so as to fulfill the necessary conductivity and also the mechanical and chemical criteria.

In an illustrative embodiment the coating is provided as a metal layer. A very efficient conductivity modulation can thereby be achieved, wherein the amount of the metal to be applied can remain relatively small because e.g. the thickness of the metal layer can be adjusted in a suitable way. It is here possible that just the surface of the track, i.e. the signal area of the track that mainly serves the generation of eddy currents, or also other portions of the base or the whole base may be provided with the metal layer, resulting in this instance in a particularly efficient manufacturing possibility. This means that in this case the base can be produced with the track of plastics formed therein with high precision while the metal layer can then be applied without the need for further measures for the targeted application or the selective removal of portions of the coating.

In an advantageous embodiment the coating comprises at least one first partial layer and one second partial layer formed on said first partial layer, wherein the first and/or the second partial layer is provided as a conductive layer. This means that the provision of a layered structure for the coating yields a high degree of flexibility in the setting of the desired properties, e.g. with respect to the conductivity, the resistance to exacting ambient conditions, e.g. with respect to corrosion, mechanical strength, or the like. For instance, a layered structure can be applied in that first of all a first partial layer is directly applied to the track or the base, said first layer ensuring the necessary high adhesion for a material to be deposited thereon subsequently. This material can then e.g. be selected with respect to the desired conductivity. If necessary, one or more further layers can follow, depending on the respective application. In an illustrative embodiment, the outermost partial layer of the coating is a conductive layer, so that at a given mean distance between the sensor coil assembly and the position encoder due to the positioning of the conductive layer as an outermost layer a relatively high sensitivity is given with respect to the eddy current generation. In another embodiment the outermost partial layer of the coating is provided as a protective layer for one or more partial layers positioned thereunder, of which at least one is configured as a conductive layer. Desired conducting materials, e.g. metals, metal alloys, or the like, can thereby be selected with respect to their electrical behavior, whereas the outermost layer can serve as passivation, so that e.g. the corrosion resistance, the surface hardness, or the like, of the coating can be adjusted as a whole in a suitable way.

Here, the outermost partial layer can be provided as a moderately thin layer, so that the efficient "air gap" between the sensor coil assembly and the track is not unnecessarily increased in size. The provision of a protective layer, which in turn may just be applied to the track or the conductive material or also to larger areas or over the whole area to the base, yields an increased reliability in the manufacture and in the handling of the position encoder already before or during incorporation in the desired application and also leads to a more reliable function during operation of the position encoder also under exacting ambient conditions. In some embodiments the partial layer serving as a conductive material and the partial layer serving as a protective material are not configured in the same way to cover the whole area, i.e. the conductive partial layer can be substantially limited to the area of the track, whereas the protective layer can be provided over large surface areas of the base so as to give the base as a whole, or at least in portions, the surface properties created by the protective layer.

In a further advantageous embodiment the coating is a conducting semiconductor material which in cooperation with the track thereby ensures the desired position-dependent eddy-current behavior. For instance, common semiconductor materials, such as amorphous silicon, or the like, can be applied in a very efficient way by way of established methods, such as CVD (chemical vapor deposition) at relatively low temperatures to a carrier material, i.e., the base body or portions thereof, resulting in low manufacturing costs together with a high precision of the manufacturing method on the whole. The degree of the desired conductivity can also be adjusted within wide ranges by correspondingly doping the semiconductor material. In some cases the conducting semiconductor material may also serve as an efficient passivation of the plastic material, so that no further protective layer is possibly needed and a high degree of chemical and mechanical resistivity of the surface of the base is nevertheless accomplished.

In an advantageous embodiment the track is formed in the predetermined direction of movement as a continuous track. This means that along the direction of movement, i.e. along the longitudinal direction of the track, said track is continuous, so that, independently of the configuration of the sensor coil assembly, eddy currents can be generated continuously along the direction of movement. This can yield a high degree of spatial resolution at a given size of the position encoder, i.e. at a given length in the predetermined direction of movement, through a continuous change in the eddy current behavior. Since especially the finally reached position-dependent eddy-current behavior is achieved by way of constructional measures, e.g. by formation of the track in the surface of the base, even relatively complex shapes of the track, for instance a sinusoidal one or other curved shapes, can be produced as continuous units, the shape of which can then be essentially maintained during further assembly or also during operation.

In a further advantageous embodiment, the track in the predetermined direction of movement comprises spatially periodic segments, so that within each periodic segment a desired high spatial resolution can be achieved. In rotary position encoders, in which an angle-dependent position indication of a rotor is needed within a specific angular segment in conformity with the pole pairs used, the "electrical" rotary angle in the track can thus be imitated in an efficient way by providing a corresponding number of periodic segments, so that within each angular section of electrical relevance the desired precise control of the stator coils of the rotary machine can be carried out.

In a further advantageous embodiment the base comprises a further track which is formed in the surface by recesses and/or elevations of plastics and which extends along the predetermined direction of movement and varies at least in a direction perpendicular to the predetermined direction of movement. Due to the provision of this further track it is possible, in case of need, to adjust the measuring range in a suitable way in that e.g. the spatial resolution is reduced in favor of a longer measuring path. This means that with a different modulation of the track and the further track the measuring range can be extended in cooperation in that e.g. the track ensures the necessary exact resolution within a small periodically repeating segment, whereas the further track permits an identification of the just sensed segment.

In a further aspect of the present invention the above-mentioned object is achieved by a position encoder for generating position-dependent eddy current losses in a sensor coil assembly. Here, the position encoder comprises a base composed of non-conducting carrier material and of a conducting material. There is further provided a track defined by the conducting material, which is embedded in the non-conducting material and extends along a predetermined direction of movement and varies at least in a direction perpendicular to the predetermined direction of movement for position-dependent eddy current generation.

In a further embodiment there is provided a surface which during operation of the position encoder must be oriented towards the sensor coil assembly and is substantially unprofiled.

Owing to this design configuration of the position encoder, conducting material is arranged in the base body such that the track is formed therein, whereby due to the embedding of the track in the base and, in the further embodiment, due to the surface covering the track, a high degree of mechanical and chemical integrity is accomplished under very exacting operating conditions. Furthermore, it is possible with this configuration to provide the track used for the position-dependent eddy-current generation in a precise and reproducible way, wherein a desired high mechanical stability of the position encoder is achieved, or wherein the conducting material can contribute to enhance the stability of the non-conducting carrier material of the base.

In an illustrative embodiment, the conducting material is provided in the form of a profiled element. This means that the conducting material in the form of the profiled element, e.g. in the form of a suitably designed metal piece, can be efficiently introduced into the non-conducting carrier material during manufacture of the base, e.g. by positioning in an injection mold, or the like, so that a very efficient manufacturing process can be achieved with a high degree of reproducibility. In one embodiment the profiled element comprises first portions with a first distance from the surface and second portions with a second larger distance from the surface. It is in this way that the profiled element can be provided as a stable coherent element, e.g. a metal piece, and can be suitably positioned in the non-conducting carrier material, so that the portions with the first smaller distance from the surface can serve as an efficient track for the position-dependent eddy-current generation, whereas the second portions with the larger distance can serve the mechanical stabilization of the non-conducting carrier material and/or the better positioning of the profiled element without any distinct impact on the eddy-current generation. This means that especially when the profiled element is provided as an inherently stable element, an efficient positioning of said element in the non-conducting carrier material as well as an increase in the inherent stability of the position encoder can be accomplished.

Advantageously, the base is configured for position detection for a rotary movement, so that said base can advantageously be used in combination with electric machines, e.g. permanently excited synchronous machines, brushless DC machines, asynchronous machines, or the like, the position encoder, as illustrated in detail already before under the preceding aspect, being adapted with respect to the required properties, e.g. chemical stability, mechanical stability, shape, or the like, wherein reproducible inexpensive and precise manufacturing methods can be used. Also in this variant of the position encoder, i.e. a non-conducting carrier material with integrated conducting material in the form of a suitable track, both an axial and a radial variant may be provided, so that also with respect to the position or the type of sensor assembly a high degree of constructional flexibility is accomplished.

BRIEF DESCRIPTION OF THE DRAWINGS

Further advantageous embodiments are defined in the attached patent claims and are also apparent from the following detailed description of further illustrative embodiments, with reference being made to the attached drawings, in which:

DETAILED DESCRIPTION OF THE INVENTION

With reference to the attached drawings, further illustrative embodiments of the invention shall now be described.

Figure 1A:
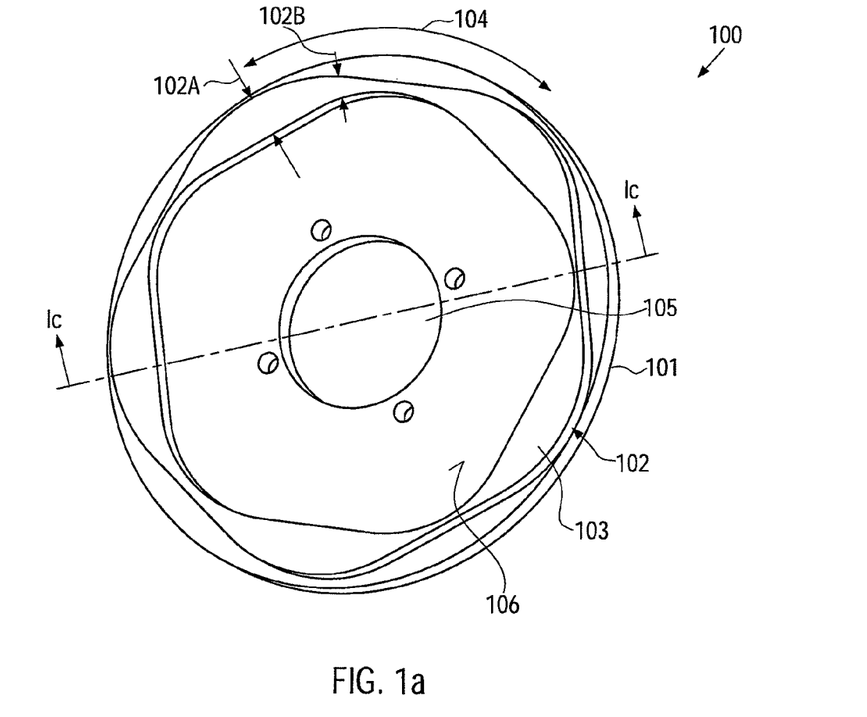
FIG. 1a schematically shows a perspective view of a position encoder for a rotary machine with an individual elevated track according to one embodiment.

FIG. 1a schematically shows a perspective view of a position encoder 100 which in the illustrated embodiment is provided for determining an angular position of a rotor of a rotary machine, for instance an electric machine, for example of a permanently excited synchronous machine, etc. The position encoder 100 comprises a base 101 which in the illustrated embodiment is made from plastics, wherein any desired suitable material mixture can be used for the plastic material.

Suitable materials can particularly be used that in the speed range of the corresponding rotary machine show the necessary mechanical stability. A thickness of the base 101, which is here configured in the form of a disc with corresponding bores 105 for fastening to a rotary shaft or a rotor of the rotary machine, can also be chosen in a suitable way, so that the necessary stability is achieved and a small constructional height is nevertheless ensured. The thickness of the base 101 may e.g. be a few millimeters up to a few centimeters. The position encoder 100 further comprises a surface 106 which during operation of the position encoder 100 faces a sensor coil assembly, as will be described in detail later, wherein part of the surface 106 is positioned in the "sensing area" of the coil, depending on the configuration of the respective sensor coil assembly. In the illustrated embodiment a track 102 is provided in the form of an elevation above the surface 106, the elevation varying in width along a direction of movement 104, so that different widths 102a, 102b are obtained and an allocation between the width 102a, 102b of the coil 102 and a path along the direction of movement 104, i.e. in this case a rotational angle, is definitely given at least over individual segments. The values for the various widths 102a, 102b which the track 102 can assume depend on the lateral detection area of the sensor coil assembly, wherein typically 1 mm or less for the minimal with and a few mm or much more, e.g. a few centimeters for the maximal width, can be used. Furthermore, the track 102 is not restricted in its shape to a specific design, provided that at least within specific segments a definite allocation is given between the form or the modulation of the eddy current behavior and the position in the direction of movement or longitudinal direction 104. Shown is e.g. a continuous or coherent sinusoidal form, but other forms are also possible, e.g. triangular designs, or the like. Furthermore, the position encoder 100 comprises a coating 103, at least on a signal area of the track 102 that is parallel to the surface 106 and provides the electrical conductivity of the track 102, so that the effective amount or surface, respectively, of the conductive material that is available for eddy current generation during sensing by a sensor coil assembly also varies along the direction of movement 104 according to the width 102a, 102b. The coating 103 is here in the form of any desired conductive material, e.g. a metal, a metal alloy, a conducting semiconductor, a conducting plastic, or the like.

Figure 1B:
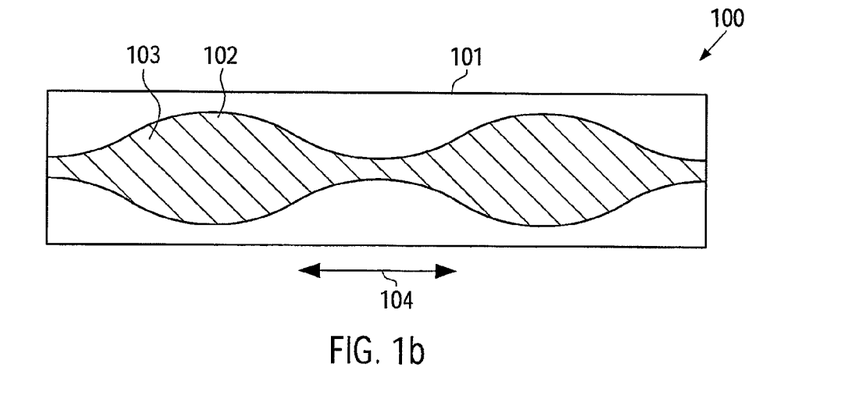
FIG. 1b schematically shows a top view on a position encoder for linear movement according to an illustrative embodiment.

FIG. 1b schematically shows a top view on a position encoder 100 according to a further embodiment, in which the position encoder is configured for sensing the position along a straight direction of movement 104. In this case the base body 101 is e.g. provided as a rectangular material piece that thereby defines the surface 106 on which the track 102, in turn, is formed. As for the selection of the plastic material for the base 101 and the track 102 and as for the coating 103, the same criteria are applicable as indicated above for the rotor position encoder 100 of FIG. 1.

Figure 1C:
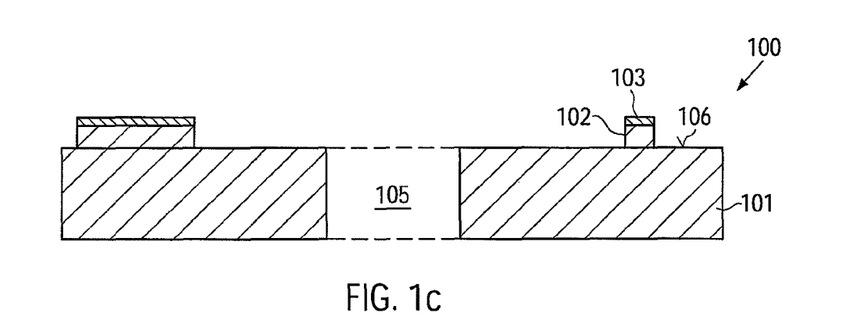
FIGS. 1c and 1d schematically show cross-sectional views of the position encoder of FIG. 1a according to various embodiments.

FIG. 1c schematically shows a cross-sectional view of the rotor position encoder 100 of FIG. 1a along the section line lc. As shown, the position encoder 100 comprises the base 101 with the surface 106 and the track 102 formed thereon. Furthermore, the coating 103 in the illustrated embodiment is just formed on a surface of the track 102 that is parallel to the surface 106. In other embodiments the coating 103 can show any desired degree of coverage for the surface 106 and the base 101, as shall be explained in detail hereinafter.

The position encoder 100 can be produced in an efficient way in that the base 101 is first fabricated with the track 102, which can e.g. be accomplished on the basis of injection molding methods on the basis of suitable templates. In other cases the track 102 can also be produced by milling the base 101. In other embodiments the track 102, if provided as a continuous track, can be fabricated in a separate manufacturing process in that e.g. a suitable plastic material is cast in a special way or fabricated otherwise. Thereupon the track 102 can be provided on the base 101 by thermal treatment, or other methods. A reliable and reproducible shape of the base 101, including the track 102, can thereby be achieved, so that the functional behavior, i.e. the position-dependent eddy-current generation, is substantially fixed by constructional measures, wherein both the flexibility in the selection of the materials for the base 101 and the track 102 and the shape in many applications can directly be taken into account. In other embodiments the track may be made from individual segments separated from one another, which are made together with the base 101 or also as separate units that are subsequently fastened to the base 101.

In some embodiments the coating 103 can then be made in that e.g. a suitable material is applied by way of coating methods, e.g. by sputtering, electroplating, chemical vapor deposition, physical vapor deposition, or the like. This can be done locally, so that, as shown in FIG. 1c, the coating 103 is just provided on the signal area, i.e., a surface of the track 102 parallel to the surface 106, whereas in other coating methods an application of the coating 103 over a larger area takes place, or however part of the coating is subsequently removed again in a selective way. In some embodiments the coating 103 comprises a metal, such as copper, aluminum, or corresponding alloys, so that a desired high surface conductivity can be obtained in the coating 103. In other cases a conducting material may be provided in the coating 103 in the form of a doped semiconductor material, a conductive plastic material, or the like.

Figure 1D:
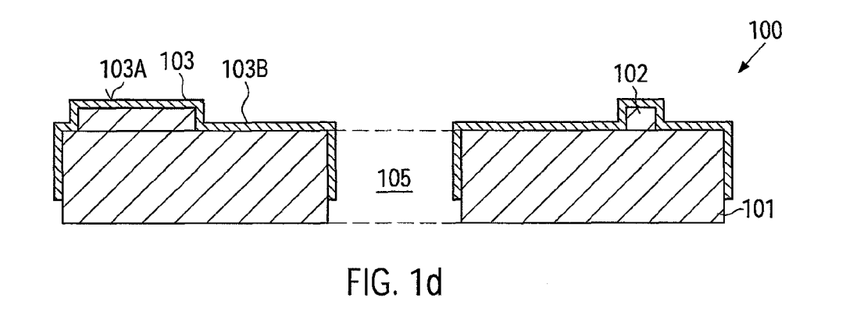

FIG. 1d schematically shows the position encoder 100 according to a further embodiment, in which the coating 103 covers at least the surface 106 and, in case of need, also further surfaces of the base 101. If necessary, the coating 103 can also cover the base 101 almost entirely, wherein a coverage of the base 101 extending beyond the track 103 has little influence on the signal behavior because on account of the elevated configuration of the track 102 a sufficiently large distance is provided between the signal area 103a proper and other lowered surface portions 103b, so that a distinct modulation of the eddy current behavior is just accomplished through the varying width of the signal area 103a. This means that in the left part of FIG. 1d the signal area 103a effects a stronger eddy-current generation on account of its larger lateral extension at an otherwise identical distance from a sensor coil assembly, as compared with the place of the track 102 shown in the right part of the position encoder 100 because at that place the lowered portion 103b which is very large in terms of area extension has much less influence on the sensor coil assembly, so that on the whole the smaller signal area 103a at the right side also effects a correspondingly smaller eddy current.

Figure 1E:
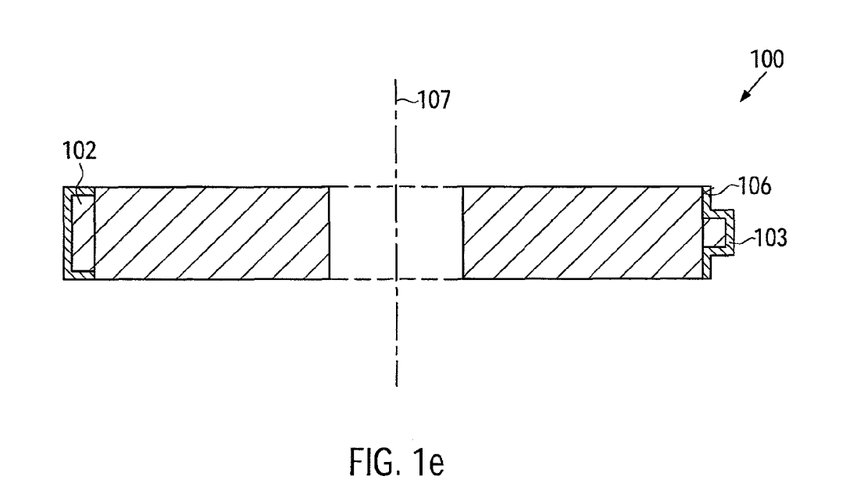
FIGS. 1e and 1f correspondingly show a cross-sectional view and a partial top view, respectively, of a position encoder for rotary machines in a radial configuration according to illustrative embodiments.

FIG. 1e schematically shows a cross-sectional view of the position encoder 100 in a radial embodiment, i.e. in an embodiment in which the surface 106 is arranged substantially in parallel with a rotational axis 107 of the position encoder 100, whereas in the "axial" embodiments shown in FIGS. 1a, 1c and 1d, it is oriented in a direction substantially perpendicular to the rotational axis 107. As shown, the surface 106 of the base 101 is thus mainly configured as a cylindrical surface on which the track 102 is provided with the desired width varying in the direction of movement. The above-mentioned advantages with respect to manufacture and material selection for the base 106, the track 102 and the coating 103 are also obtained for this embodiment.

Figure 1F:
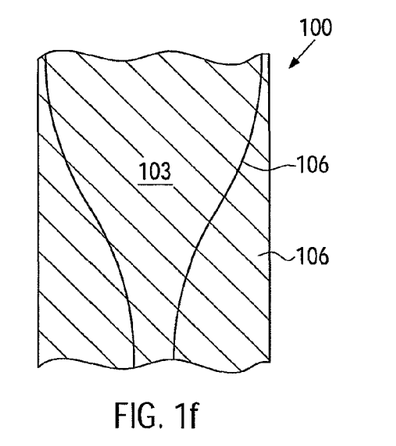

FIG. 1f schematically shows a top view on part of the surface 106 with the track 102 formed therein and the coating 103.

Figure 1G:
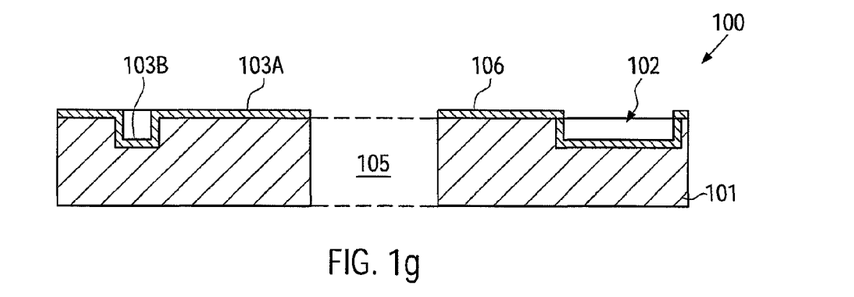
FIG. 1g schematically shows a cross-sectional view of an embodiment, in which the track is provided in a plastic material in the form of appropriately designed "depressions" or recesses according to illustrative embodiments.

FIG. 1g schematically shows the position encoder 100 according to a further embodiment, in which the track 102 is formed in the surface 106 in the shape of a recess, resulting in a substantially inverse behavior as compared with FIG. 1d. This means that in the embodiment shown in FIG. 1g a relatively large eddy current can be expected upon impact of the sensor coil assembly in both positions at the left side, whereas at the right side a considerably smaller portion of eddy current is generated due to the larger lateral dimension of the track or recess 102 because the conductive surfaces 103a, 103b are now provided with a sufficiently large distance, for instance of a few millimeters. As for the manufacture of the base 101 and the track 102, the same criteria as have been indicated above are applicable. This means that the track 102 in the form of the recess varying in lateral direction can be formed by any suitable methods, e.g. injection-molding methods, milling, etc.

Figure 1H:
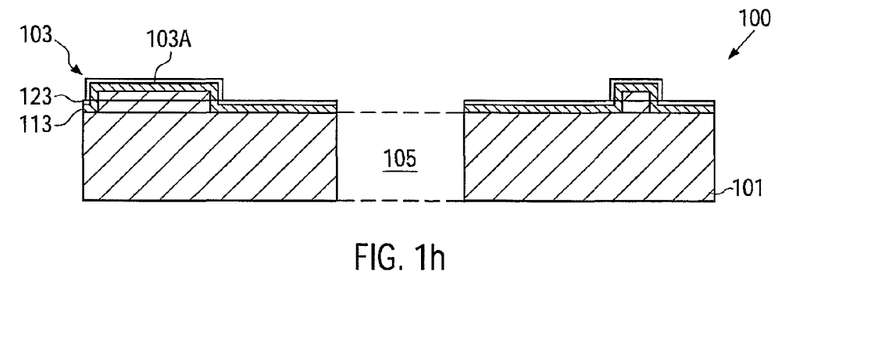
FIG. 1h schematically shows a cross-sectional view in which the coating for generating desired conductivity is provided in the form of a plurality of partial layers.

FIG. 1h schematically shows the position encoder 100 according to further embodiments, in which the coating 103 comprises at least a first partial layer 113 and a second partial layer 123, where further layers can also be provided, if necessary. In one embodiment the partial layer 113 is provided as a conductive material that e.g. in the illustrated embodiment is applied at least to the surface 106 over the whole area. The partial layer 123 is the outermost layer of the coating 103 in the illustrated embodiment and can here serve as a suitable protective layer for the passivation of the conducting layer 113. For instance, the layer 123 can be provided as any desired suitable dielectric material to thereby give the conductive material in the layer 113 a certain desired property, e.g. with respect to chemical resistivity, or the like. For instance, the layer 123 can be provided in the form of a plastic material, e.g. as a polymer material, or it can also be provided as an inorganic coating, e.g. in the form of silica, aluminum oxide, glass materials, plastics, polymer materials, depending on the desired surface quality, or the like. In this case the coating 123 is provided with an adequate thickness to deploy the desired protective action on the one hand and not to unnecessarily increase the effective distance between a sensor coil assembly and the electrically operative surface 103a on the other hand. For instance, suitable coating materials can be provided with almost any desired layer thickness ranging from a few micrometers to a few 10 or 100 micrometers or, in case of need, also with a greater thickness. The partial layer 113 containing the conducting material can also be provided with a relatively small layer thickness because for instance the mechanical integrity thereof can be safeguarded by the layer 123 positioned thereabove. A desired electrical behavior can thereby be achieved under small material expenditure for the conducting material, and a desired surface quality of the position encoder 100 is nevertheless ensured. If necessary, the layers 113 and 123 can show a different degree of coverage on the base 101 to improve the functional behavior, if necessary, or to save material costs. For instance, the conducting material of the layer 113 may just be provided on specific portions, e.g. the signal area 103a or optionally on the surface 106, whereas the layer 123 may be provided, in case of need, almost over the whole base 101 to achieve the desired protective action. In other embodiments, the layer 123 is a conducting material whereas the layer 113 serves as an adhesive layer that exhibits good adhesion with respect to the material of the base 101 and also with respect to the layer positioned thereabove. The layer 113 can here be a conductive material or also an insulating material.

Figure 1I:
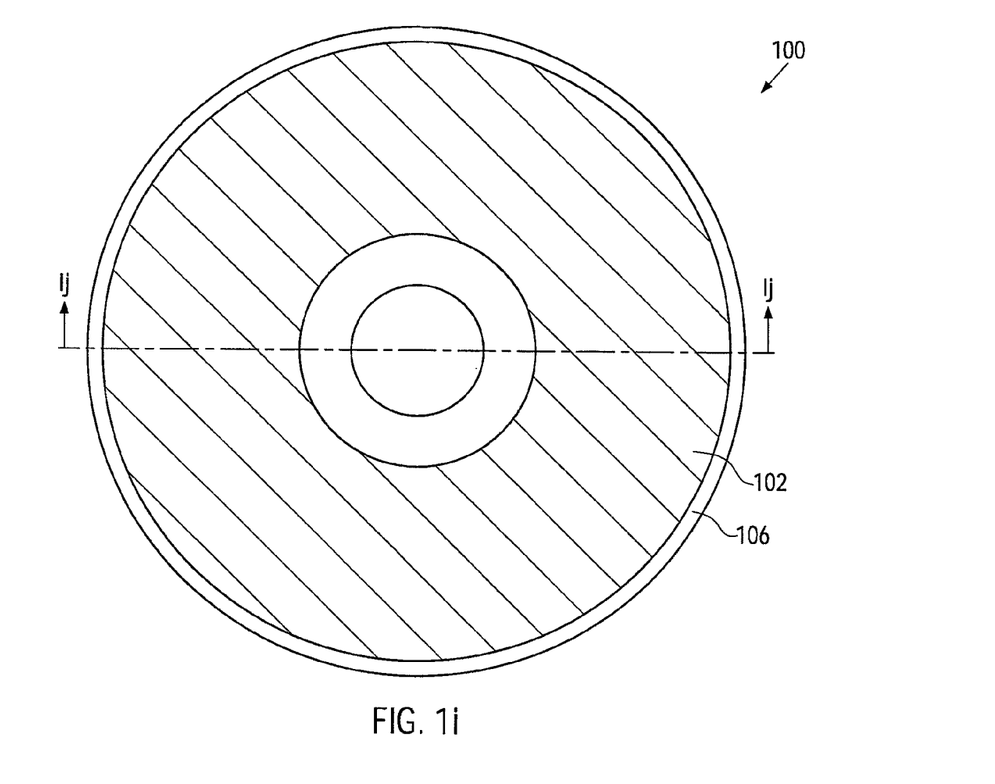
FIGS. 1i and 1j correspondingly show a top view and a cross-sectional view, respectively, in which the locally dependent eddy-current generation behavior is achieved by varying the height of the track.

FIG. 1i schematically shows a top view on the position encoder 100 according to a further embodiment, in which the track 102 is provided on the surface 106 with an almost constant width. The modulation of the eddy current behavior that is needed for the function of the position encoder 100 is achieved in this embodiment by way of a "height modulation" of the track 102 along the direction of movement.

Figure 1J:
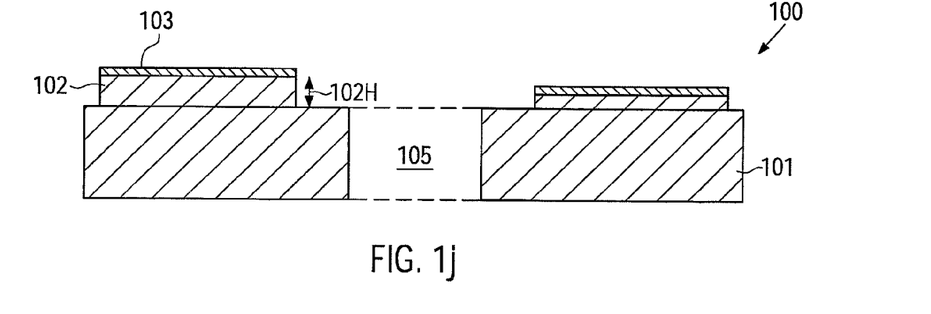

FIG. 1j schematically shows a cross-sectional view along section line 1j of FIG. 1i, the figure showing a position for generating a large eddy current (left side) and a position for generating a small eddy current (right side). This means that the track 102 has a height 102h which varies along the direction of movement, so that a distance of the coating 103 from a sensor coil assembly varies as well and the eddy current behavior is thereby modulated in response to the position. In this embodiment the coating 103 with the conducting material is applied efficiently by way of any of the aforementioned methods, whereas in other embodiments an efficient coating can also be provided by means of a foil material because especially the relatively constant width of the track 102 permits an application by way of a roller, etc.

In a further illustrative embodiment the height modulation of the track 102 as shown in FIGS. 1i and 1j can also be combined in an effective way with a corresponding variation of the width, as is described in the preceding embodiments, so that a very efficient and strong position-dependent modulation of the eddy current behavior along the direction of movement 104 takes place since both height, and thus the distance, and lateral dimension of the conductive material of the coating 103 are varying. This yields a great change rate of the eddy current response upon change in the position in the direction of movement, so that neighboring places output a distinctly different signal.

Figure 1K:
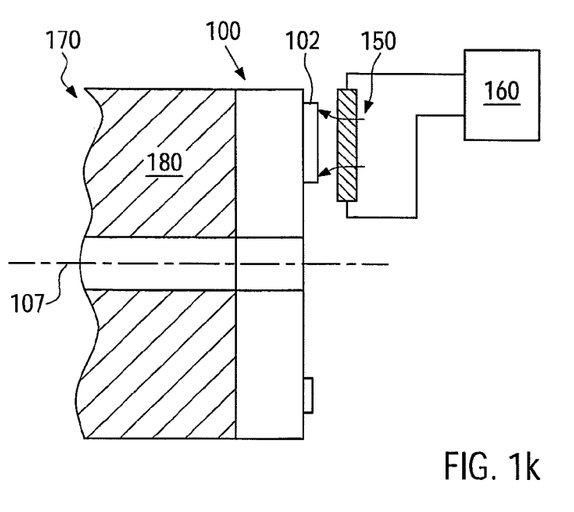
FIGS. 1k to 1m schematically show cross-sectional views and a top view, respectively, of the position encoder in combination with a sensor coil assembly according to illustrative embodiments.

FIG. 1k schematically shows an arrangement of the position encoder 100 according to an axial embodiment, as is e.g. shown in FIG. 1a, wherein the position encoder 100 is mounted on a rotary machine 170, e.g. an electric machine. This means that the position encoder 100 is mechanically coupled with a rotor 180 of the machine 170, so that it rotates about the rotational axis 107. Furthermore, a sensor coil assembly 150 is stationarily mounted axially spaced apart from the coil 102, so that an interaction between the track 102, i.e., by the applied coating 103, and one or a plurality of coils in the assembly 150 is created, wherein due to the locally dependent attenuation of the one or the plurality of coils in the assembly 150 a corresponding signal is available for an evaluation unit 160.

Figure 1L:
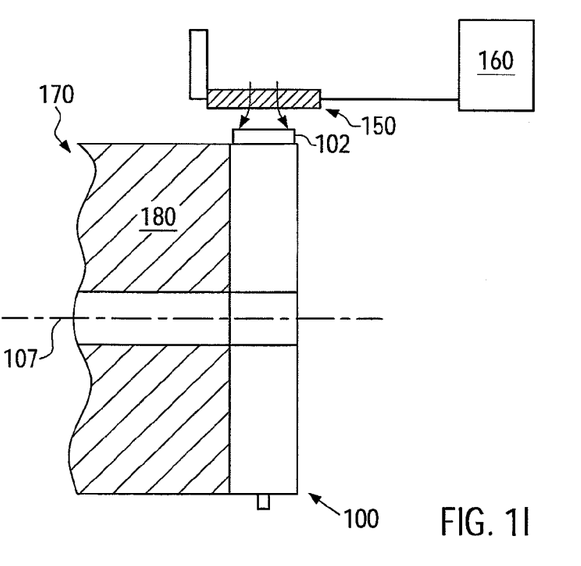

FIG. 1l schematically shows the position encoder 100 according to a radial embodiment, as is e.g. shown in FIG. 1e, wherein the track 102 perpendicular to the rotational axis 107 is now read out by the sensor coil assembly 150.

Figure 1M:
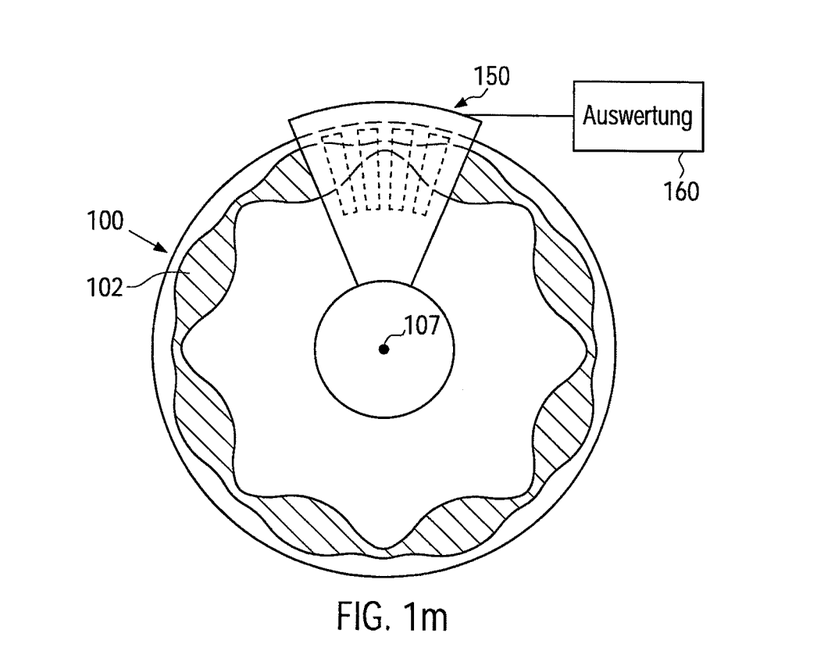

FIG. 1m schematically shows a top view on the position encoder 100 with a corresponding sensor coil assembly 150 in an axial arrangement, i.e. the rotational axis 107 is oriented substantially perpendicular to the surface 106.

Figure 1N:
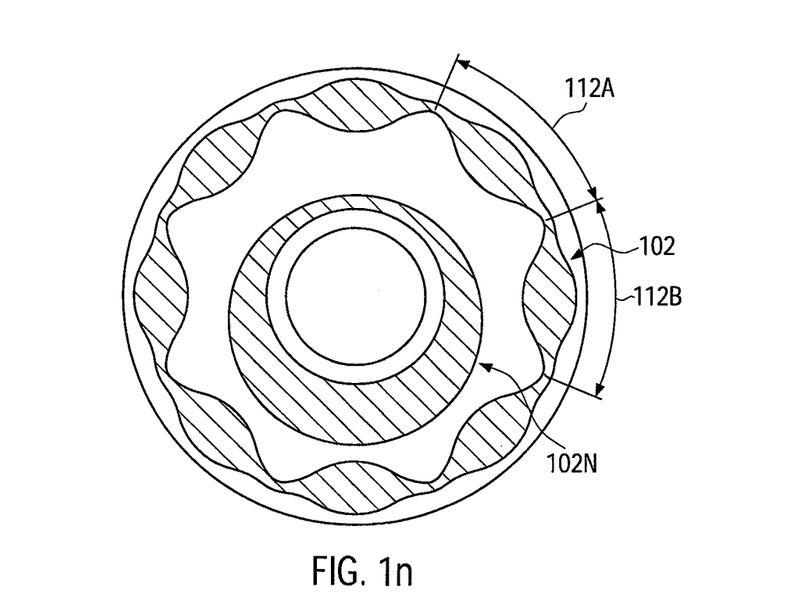
FIG. 1n schematically shows a top view on the position encoder with a plurality of encoder tracks according to illustrative embodiments.

FIG. 1n schematically shows the position encoder 100 according to further embodiments in which at least one further track 102n is provided and shows an eddy current behavior varying along the direction of movement in response to the position. More position information can thereby be gained in that e.g. the tracks 102, 102n represent a different longitudinal measurement range. In the illustrated embodiment the track 102, for instance, comprises a plurality of periodically repeating segments 112a, . . . , 112b, which appear to the sensor coil assembly as an identical unit, but which permit a desired high spatial resolution due to the great spatial modulation within each segment 112a, 112b.

On the other hand, the track 102n shows less spatial resolution power, i.e. the change in the eddy current behavior along the direction of movement 104 is less pronounced, but a larger measurement path is obtained, i.e. in the illustrated example a larger angular range which can optionally cover a full circumference of 360 degrees. The track 102n can be made in the same way as track 102, resulting in a high degree of reproducibility and precision in this case as well. To be more specific, with the constructional fixation of the tracks 102, 102n, it is possible to achieve a smaller spatial distance between the tracks, resulting in a high "information density" at a given size of the surface 106 and of the base body 101, respectively.

It should be noted that a corresponding configuration with a plurality of tracks 102, 102n can also be provided in a radial embodiment, or a mixed embodiment may be provided, where one or a plurality of tracks are provided as axial tracks, as shown in FIG. 1n, whereas one or a plurality of tracks may be provided as radial tracks, as shown and explained e.g. in FIG. 1i for an individual track.

With reference to FIGS. 2a to 2d further illustrative embodiments shall now be described, in which an efficient structuring of the eddy current behavior is achieved in a base of the position encoder, the base being here composed in illustrative embodiments substantially of a non-conductive carrier material that encloses a conductive material.

Figure 2A:
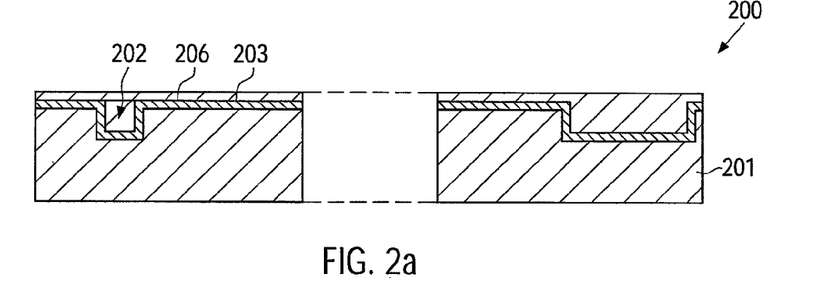
FIGS. 2a to 2c schematically show cross-sectional views of a position encoder with a conducting material integrated into a non-conducting carrier material, which forms a position-dependent track according to further illustrative embodiments.

FIG. 2a schematically shows a cross section of a position encoder 200 which is provided as an axial rotor position encoder in the illustrated version. The position encoder 200 comprises a base 201, which in the illustrated embodiment is mainly composed of a non-conducting material, e.g. plastics, into which a conductive material 203 is locally introduced such that a track 202 is thereby defined that leads to the desired position-dependent eddy current behavior, as has been explained above. Furthermore, in the illustrated embodiment a surface 206 is formed that covers the conductive layer 203 at least over track 202. In the illustrated embodiment the conducting material 203 is provided e.g. in the form of a profiled material piece, e.g. a metal-containing material piece, which in some illustrative embodiments shows a moderately high inherent stability, so that the provision of the conductive material 203 can also improve the mechanical stability of the base 201 even if said base is provided with a moderately small thickness. For instance, the conductive material 203 may be provided in the form of a metal sheet which is suitably profiled, e.g. by punching, and which is then introduced in an appropriate way into the material of the base 201. To this end the conductive material 203 in the inherently stable form can e.g. be injection-molded, with the conductive material 203 being completely enclosed by the plastic materials, if necessary. This means that in this case an unprofiled surface 206 is obtained that possibly simplifies the handling and mounting of the position encoder 200 and also provides corresponding protection for the conducting material 203. On the other hand, the desired modulation of the eddy current behavior can be achieved in an efficient and reproducible way by profiling the material 203. The material thickness for the surface 206 over the conductive material 203 can here be set in a suitable way to be so small that the desired protective action can be achieved and a corresponding "air gap" relative to an encoder coil assembly is nevertheless kept at a small value. It should be noted that in illustrative embodiments the non-conducting material of the base body 201 in the form of the surface 202 does not necessarily cover the whole conducting material 203, but also serves to achieve a substantially plane surface, with elevated portions of the conducting material 203 forming part of the surface 202. Furthermore, it should be noted that the track 202 can also be defined by "elevated" portions within the base.

Figure 2B:
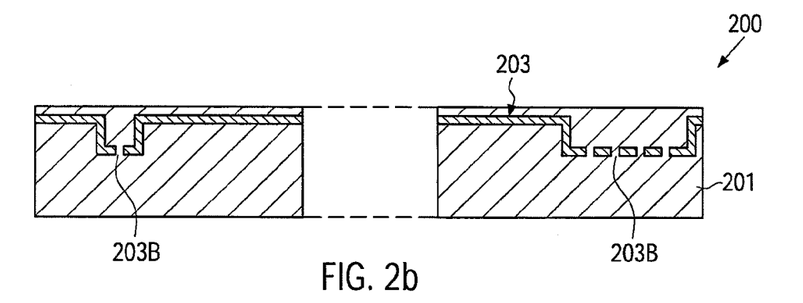

FIG. 2b schematically shows the position encoder 200 in a further embodiment, in which corresponding bores 203b are provided in lowered portions of the conducting material 203, so that e.g. upon injection-molding of the conducting material 203 an efficient "toothing" of the plastic material with the conducting material 203 can take place without a substantial impact on the eddy current behavior because the lowered portions hardly contribute anything to the eddy current behavior at any rate. As a result, the spatial definition of the track 202 can be maintained in an efficient way by way of a profiled material, with a high stability of the base 201 being nevertheless achieved through the bores 203b.

Figure 2C:
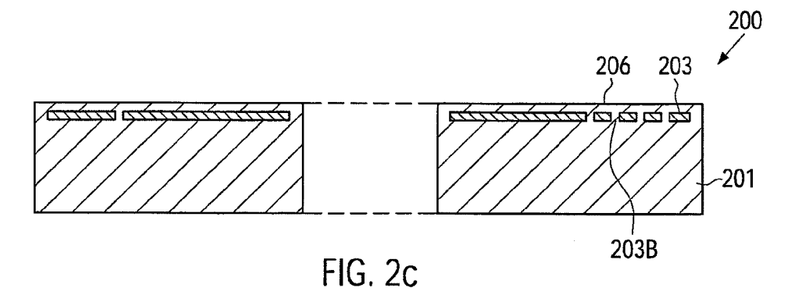

FIG. 2c schematically shows a cross-sectional view of the position encoder 200 according to a further illustrative embodiment in which the conducting material 203 on the base 201 is provided in a substantially "two-dimensional" or plane arrangement, wherein a corresponding structuring or modulation of the eddy current behavior is achieved on the basis of corresponding recesses or bores 203b. For instance, in one embodiment the conducting material 203 is provided in the form of a conducting material piece, which is advantageously inherently stable, with the bores 203b being provided along the direction of movement such that the amount of the effectively acting conducting material efficiently varies in response to the position. For instance, at the left side of FIG. 2c a high filling degree of the conducting material 203 is accomplished on account of a small number of bores 203b, and thus a correspondingly great eddy-current generation, whereas at the right side of FIG. 2c a considerably smaller filling degree of conducting material 203 leads to a considerably smaller eddy-current formation.

The position encoder 200 of FIG. 2c can be produced on the basis of any desired suitable methods, for instance by injection molding of the conducting material 203, wherein the bores 203b lead again to an efficient toothing of the non-conducting material of the base 201, which forms the major portion, with the conducting material 203. Very stable position encoders can thereby be produced that are also suited for very high speeds.

Figure 2D:
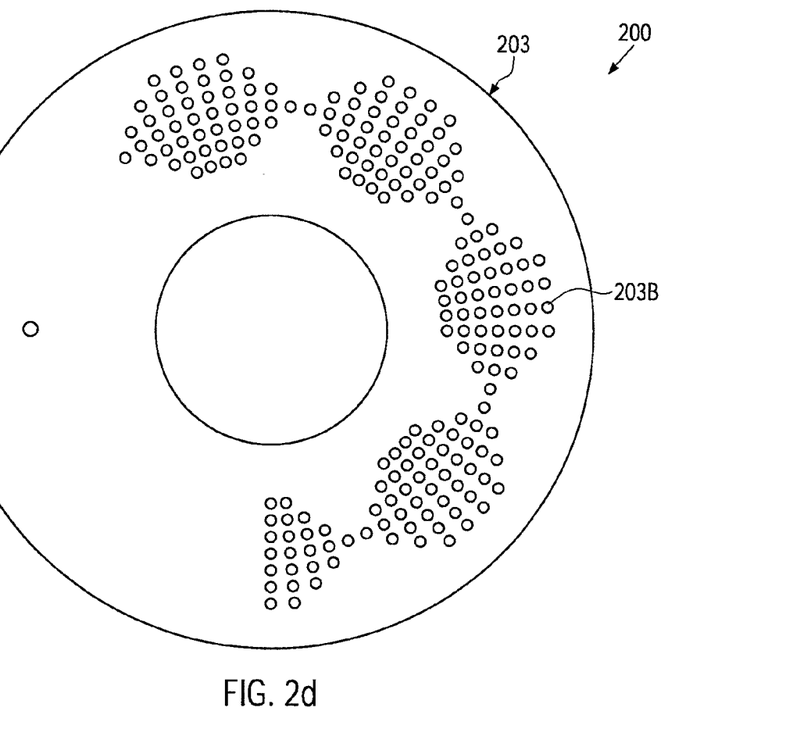
FIG. 2d schematically shows a top view on a position encoder in which a substantially two-dimensional structuring of the conductive material is shown.

FIG. 2d schematically shows a top view on the conducting material 203, as can e.g. be used in the embodiment of FIG. 2c, wherein the bores 203b ensure a position-dependent eddy-current response along the direction of movement.

In further embodiments a radial arrangement is provided in which the conducting material 203 is provided on the face of the base 201, wherein however a surface without a pronounced topology similar to the surface 206 is created. When the conducting material 203 also serves to increase the stability of the base, it can also be provided in the radial embodiment in a suitable way to extend over a larger portion of the base, in a way similar to the one shown in FIGS. 2a to 2c, wherein, however, a modulation for generating a track is not needed, except for one on the rim, which is sensed in the radial embodiment by a sensor coil. In further embodiments it is also possible to use a combination of radial and axial version if more than one track is needed. In other embodiments several tracks can be provided in only an axial or only a radial design.

Hence, the present invention provides position encoders in which the base is substantially composed of a non-conducting material and particularly of a plastic material, wherein the position-dependent eddy-current generation can be achieved in a very efficient and reproducible way in that in some aspects a suitable track is formed on the surface of the base by way of elevations and/or recesses, in which a suitable coating can then be applied or in other illustrative embodiments a suitable profiling of an electrically conducting material is made within a base made substantially of plastics. The design of the base and the associated track permits a design of the position encoder in almost any desired suitable size in conformity with the corresponding application, i.e., length or diameter can be efficiently adapted to the size of the moving part or the shape thereof, wherein the fabrication can be accomplished at small costs and small manufacturing tolerances at the same time.

The invention claimed is:

1. A position encoder for generating position-dependent eddy-current losses in a sensor coil assembly, comprising:
   a base composed of non-conducting carrier material and a conducting material;
   a surface which is oriented towards the sensor coil assembly during operation of the position encoder;
   a track made of the conducting material, which is embedded in the non-conducting material and extends along a predetermined direction of movement and varies at least in a direction perpendicular to the predetermined direction of movement such that a profiled element is formed for position-dependent eddy-current generation, wherein
   the profiled element comprises first portions with a first distance relative to the surface and second portions with a second greater distance relative to the surface, at least the second portions comprising through holes in which non-conducting carrier material is contained.

2. The position encoder according to claim 1, wherein the base is formed in a shape suited for position detection for a rotational movement.

3. The position encoder according to claim 2, wherein the surface is arranged perpendicular to a rotational axis of the rotational movement.

4. The position encoder according to claim 1, wherein the conducting material is metal.

5. The position encoder according to claim 4, wherein the profiled element is configured as a mechanically stable element.

6. The position encoder according to claim 1, wherein the non-conducting carrier material is a plastic material.

7. The position encoder according to claim 1, wherein the surface is substantially unprofiled.

* * * * *